(12) United States Patent
Lee et al.

(10) Patent No.: US 8,338,059 B2
(45) Date of Patent: Dec. 25, 2012

(54) HYBRID MEMBRANE-ELECTRODE ASSEMBLY WITH MINIMAL INTERFACIAL RESISTANCE AND PREPARATION METHOD THEREOF

(75) Inventors: Sang Hyun Lee, Deageon (KR); Hyuk Nyun Kim, Deageon (KR); Go Young Moon, Deageon (KR); Ha Chull Chung, Cheonan-si (KR); Kyoung Il Park, Seoul (KR); Seong Min Song, Seoul (KR)

(73) Assignee: LG Chem, Ltd., Seoul (KR)

( * ) Notice: Subject to any disclaimer, the term of this patent is extended or adjusted under 35 U.S.C. 154(b) by 154 days.

(21) Appl. No.: 12/877,700

(22) Filed: Sep. 8, 2010

(65) Prior Publication Data

US 2011/0111328 A1    May 12, 2011

Related U.S. Application Data

(62) Division of application No. 10/565,887, filed as application No. PCT/KR2004/001969 on Aug. 5, 2004, now abandoned.

(30) Foreign Application Priority Data

Aug. 5, 2003 (KR) .................................. 2003-54098

(51) Int. Cl.
*H01M 8/10* (2006.01)
*H01M 4/58* (2010.01)
*H01M 10/44* (2006.01)
*H01M 8/00* (2006.01)

(52) U.S. Cl. .......................................... 429/535; 29/746

(58) Field of Classification Search ............ 429/209–246
See application file for complete search history.

(56) References Cited

U.S. PATENT DOCUMENTS

| 5,330,860 | A | * | 7/1994 | Grot et al. ..................... 429/494 |
| 5,415,888 | A | | 5/1995 | Banerjee et al. |
| 6,171,721 | B1 | | 1/2001 | Narayanan et al. |
| 6,187,468 | B1 | * | 2/2001 | Shinkai et al. ................ 429/481 |
| 6,391,486 | B1 | | 5/2002 | Narayanan et al. |
| 2003/0143454 | A1 | * | 7/2003 | Hatoh et al. .................... 429/44 |

FOREIGN PATENT DOCUMENTS

| EP | 0 955 687 | 11/1999 |
| EP | 1 298 747 | 4/2003 |
| EP | 1 304 753 | 4/2003 |
| EP | 1 304 754 | 4/2003 |
| JP | 08-236122 | 9/1996 |

(Continued)

*Primary Examiner* — Robert Hodge
*Assistant Examiner* — Stephen Yanchuk
(74) *Attorney, Agent, or Firm* — McKenna Long & Aldridge LLP

(57) ABSTRACT

The present invention provides a membrane-electrode assembly comprising: electrodes consisting of a anode comprising a gas diffusion layer and a catalyst material-containing active layer, and an cathode comprising a diffusion layer and a catalyst material-containing active layer; and an electrolyte membrane interposed between the anode and the cathode and comprising a catalyst material-containing active layer at one or both sides, the electrodes being hot-pressed, to the electrolyte membrane, wherein in coating the active layer on the gas diffusion layer, the viscosity of the active layer is in a range of 100 to 10,000 cPs, as well as a production method thereof. The inventive membrane-electrode assembly has a low interfacial resistance between the membrane and the electrodes, as well as high catalyst availability and excellent power density, and can be mass-produced.

7 Claims, 7 Drawing Sheets

FOREIGN PATENT DOCUMENTS

| | | |
|---|---|---|
| JP | 08-236123 | 9/1996 |
| JP | 09-180727 | 7/1997 |
| JP | 10-003929 | 1/1998 |
| JP | 11-016586 | 1/1999 |
| JP | 11-288727 | 10/1999 |
| JP | 2001-068119 | 3/2001 |
| JP | 2001-345110 | 12/2001 |
| WO | WO 01/99216 | 12/2001 |

* cited by examiner

A) dilute catalyst ink    B) think catalyst ink

HYBRID MEMBRANE-ELECTRODE ASSEMBLY WITH MINIMAL INTERFACIAL RESISTANCE AND PREPARATION METHOD THEREOF

This application is a divisional application of U.S. application Ser. No. 10/565,887, filed Aug. 14, 2006 now abandoned, which is a National Stage Application of PCT/KR2004-001969, filed on Aug. 5, 2004, and claims priority to Korean Application No. 10-2003-0054098, filed Aug. 5, 2003, all of which are hereby incorporated by reference in their entireties.

TECHNICAL FIELD

The present invention relates to a membrane-electrode assembly (MEA), a key component of a fuel cell, as well as a production method thereof. More particularly, the present invention relates to a membrane-electrode assembly which is suitable for mass production and has a low interfacial resistance between the membrane and the electrode, as well as a production method thereof.

BACKGROUND ART

Fuel cells have recently received much attention as new electric generators. In the near future, the fuel cells will substitute for the existing electric generators as either automobile batteries, power sources for electric generation or portable electric sources.

A polymer electrolyte fuel cell is a kind of a direct current generator converting the chemical energy of fuel directly to electric energy by electrochemical reaction. It comprises a continuous stack complex equipped with membrane-electrode assemblies which are the heart of the fuel cell and bipolar plates which serves to collect generated electricity and to supply fuel. The membrane-electrode assembly refers to an assembly comprising: an electrode where electrochemical catalytic reaction occurs between fuel (aqueous methanol solution or hydrogen) and air; and a polymer membrane where the transfer of hydrogen ions occurs.

Meanwhile, all electrochemical reactions consist of two individual reactions, i.e., oxidation reaction occurring at an anode(fuel electrode), and reduction reaction occurring at a cathode(air electrode), in which the two electrodes are separated from each other by a polymer electrolyte membrane. In a direct methanol fuel cell, methanol and water in place of hydrogen are supplied to the anode, and hydrogen ions produced in an oxidation process of methanol are transferred to the cathode through the polymer electrolyte membrane and generates electricity by reduction reaction with oxygen supplied to the cathode. Such reactions are as follows:

anode (fuel electrode): $CH_3OH + H_2O \rightarrow CO_2 + 6H^+ + 6e^-$
cathode(air electrode): $\frac{3}{2}O_2 + 5H^+ + 6e^- \rightarrow 3H_2O$
Overall reaction: $CH_3OH + \frac{3}{2}O_2 \rightarrow CO_2 + 3H_2O$ The electrode of the direct methanol fuel cell is typically a diffusion electrode. The electrode consists of two layers, a gas diffusion layer (electrode support layer) and an active layer. The gas diffusion layer serves as a support and to diffuse fuel, and is made of carbon paper or carbon cloth. The active layer is adjacent to the polymer electrolyte membrane to cause substantial electrochemical reaction and is made of either a platinum catalyst particle dispersed in a carbon particle or platinum or alloy black. The electrochemical reaction occurs at a three-phase interfacial zone in which fuel diffused from the gas diffusion layer is exposed to the interface between the electrolyte membrane and the platinum catalyst particle of the active layer. Thus, it is important for the improvement of performance to enlarge the area of the three-phase reaction zone, which is available in the electrochemical reaction, and to place the platinum catalyst in the three-phase reaction zone to the maximum possible extent. However, unlike a liquid electrolyte, a depth to which the solid polymer electrolyte membrane can be impregnated into the electrode is limited to 10 μm, so that the area of the three-phase reaction zone, which can be enlarged, is limited, and only a portion of the platinum catalyst, which is exposed to the three-phase reaction zone, can participate in the electrochemical reaction in the fuel cell. Accordingly, in order to increase the power density of the fuel cell, an electrode structure is required in which the area of the three-phase reaction zone is maximized and the maximum possible amount of platinum is placed in the active layer which is in contact with the electrolyte.

In the initial development stage of the direct methanol fuel cells, an electrode was used which had been prepared by adding Pt-black particles onto carbon paper or carbon cloth used as a diffusion layer by a spray, etc., so as to form an active layer, and adhering the active layer to an electrolyte membrane by a hot-pressing process. However, the prior structure had problems in that the interfacial resistance between the active layer and the electrolyte membrane was high to make the structure inefficient, and a significant amount of the catalyst particles penetrated into the diffusion layer and thus did not participate in the reaction, indicating that the expensive noble catalyst was useless.

In attempts to solve such problems, methods of forming a catalytic layer directly on an electrolyte membrane as in a decal process (U.S. Pat. No. 6,391,486) and a sputter deposition process (U.S. Pat. No. 6,171,721) were proposed.

However, the decal process is one comprising forming an active layer separately and then laminating the active layer with an electrolyte membrane, but requires a higher temperature than the glass transition temperature of the electrolyte membrane upon the laminating step, thus requiring separate pretreatment which makes the process complex. Another problem is that the transfer of the separately formed active layer is not properly performed.

In the sputter deposition process, the efficiency of a catalyst can be increased, but a thin film is formed at a thickness of more than 1 μm due to the crystalline nature of the catalyst, thus preventing the transport of cations. Accordingly, only a very small amount of the catalyst will inevitably be used, resulting in a reduction in power density. Also, the sputter deposition process has problems in that a higher power density than a given level can not obtained, and a high-vacuum region is used due to the characteristic of a semiconductor process, resulting in increases in production cost and time, which renders the process unsuitable for mass production.

While the above-described coating methods have their own advantages, they have a serious disadvantage in that it is difficult to form a stable interface between a solid polymer electrolyte membrane and nanosized catalyst particles.

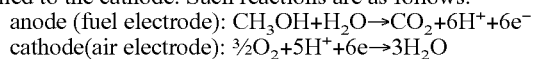
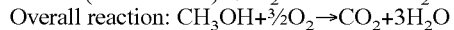
1: a diffusion layer of a anode;
2: an active layer of the anode;
3: an active layer of an electrolyte membrane;
4: an electrolyte membrane (polymer membrane);
5: an active layer of the electrolyte membrane;
6: an active layer of the cathode;
7: a diffusion layer of the cathode; and
8: a catalyst coated with electrolyte.

Figure 2:
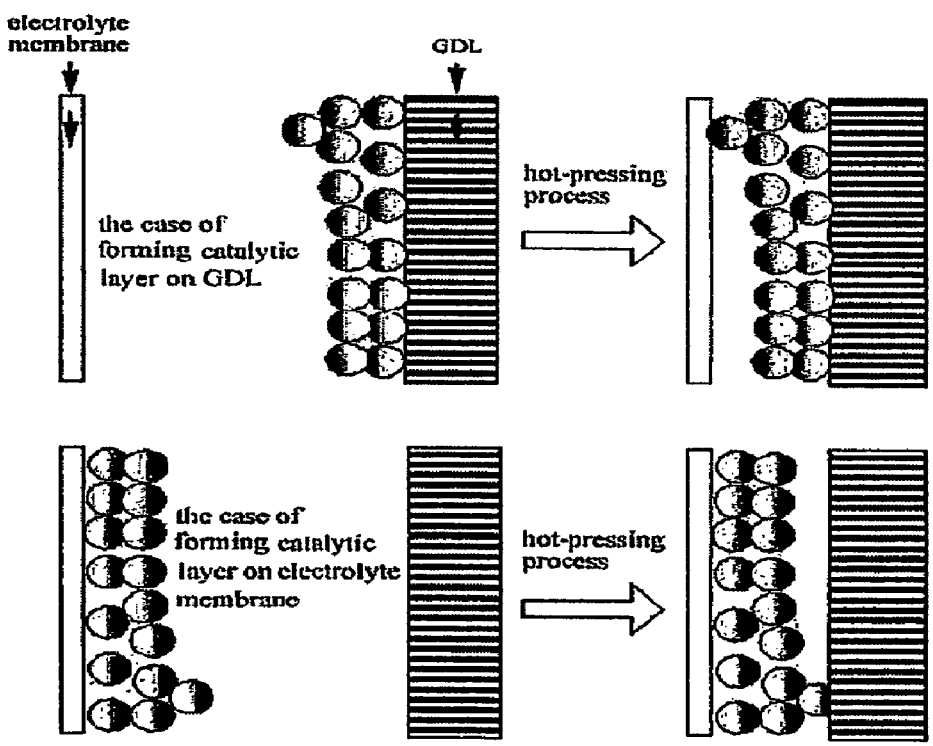

FIG. 2 shows the comparison of the laminating state of an electrolyte membrane to a catalytic active layer between a case where the catalytic layer is formed on a diffusion layer (the upper portion of the figure) and a case where the catalytic layer is formed on an electrolyte membrane (the lower portion of the figure).

Figure 3:
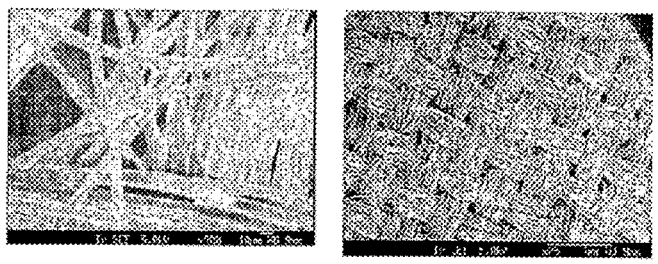

FIG. 3 shows microscope photographs of carbon cloth (left side) and carbon cloth (right side), each of which is used as a diffusion layer.

Figure 4:
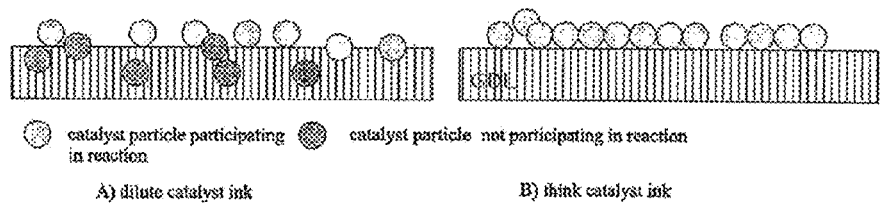

FIG. 4 shows the participation of catalyst particles in reaction according to the viscosity of catalyst ink used in coating a diffusion layer.

Figure 5:
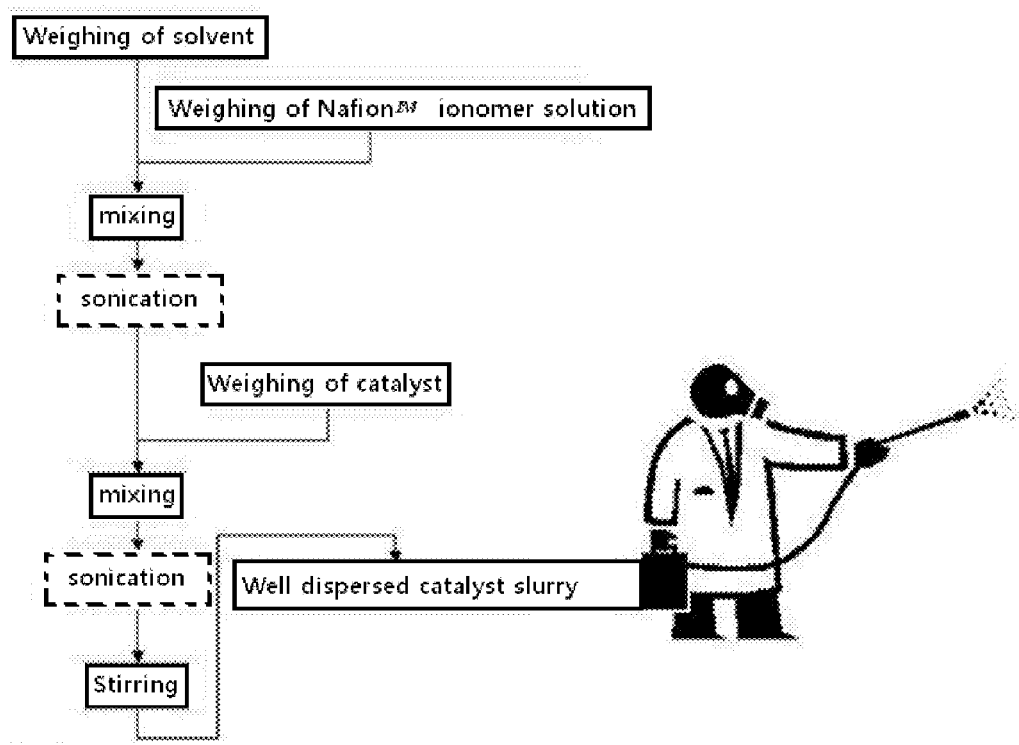

FIG. 5 is a schematic diagram showing a process of preparing catalyst ink.

Figure 6:
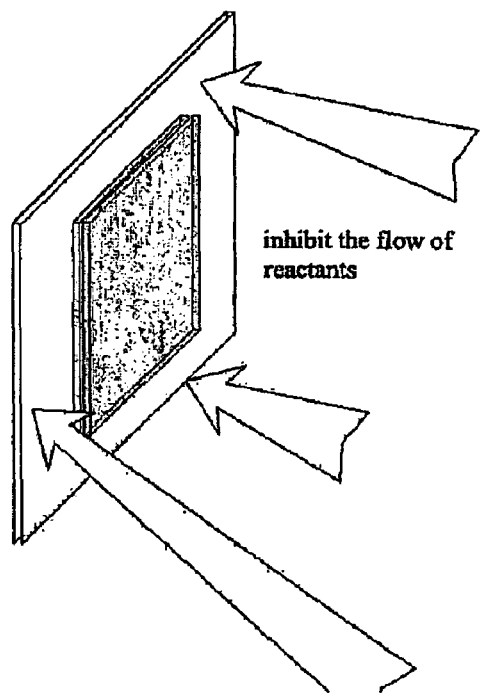

FIG. 6 is a perspective view showing an electrolyte membrane which had been coated with a catalytic active layer using a mask.

Figure 7:
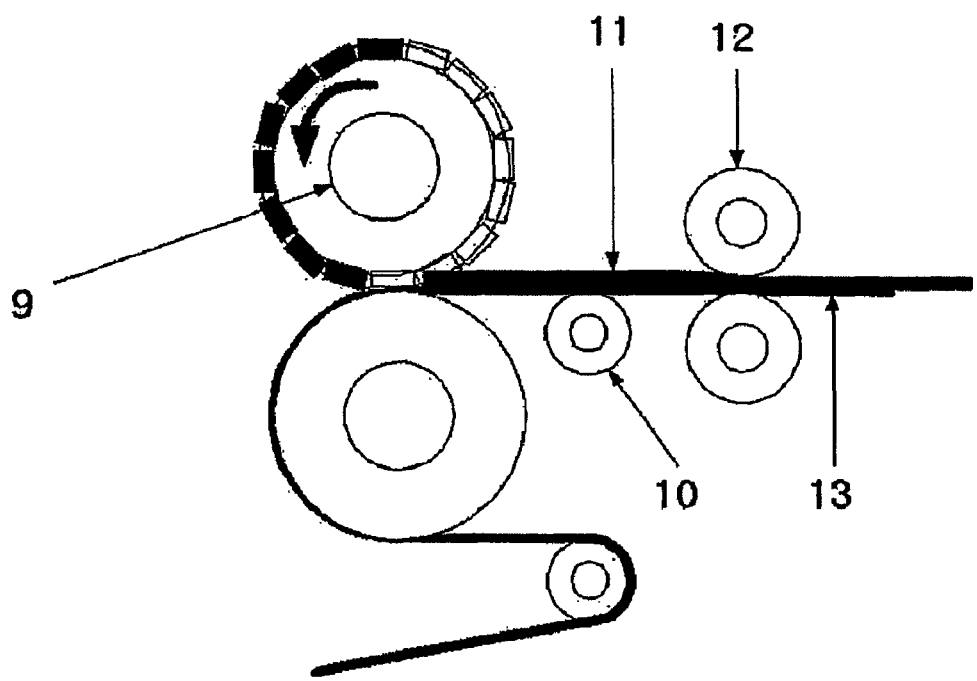

FIG. 7 is a schematic diagram showing a method of coating an active layer on a gas diffusion layer by a screen printing process.

9: a screen printer;
10: an automatic feed head;
11: an active layer (catalytic layer);
12: a compression roller; and
13: a gas diffusion layer (carbon paper or carbon cloth).

Figure 8:
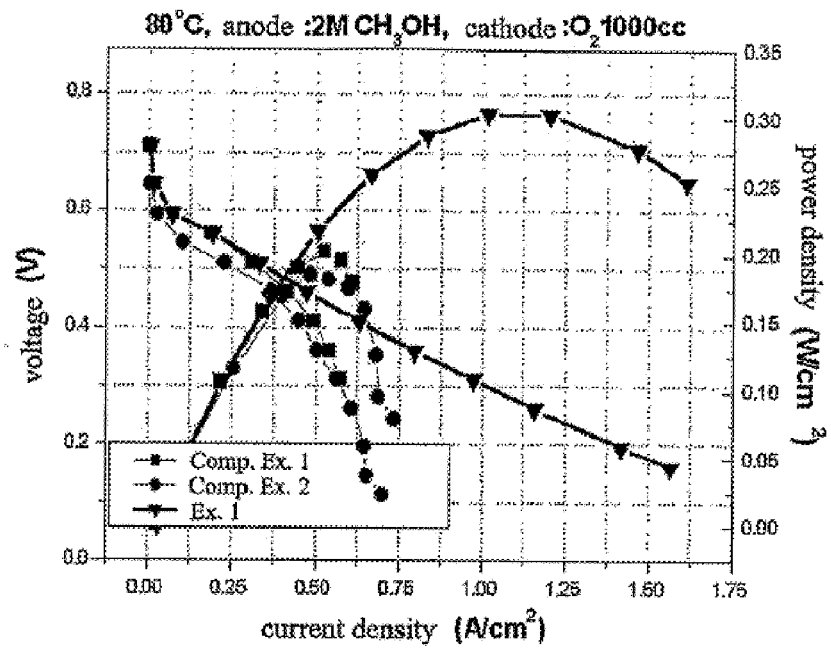

FIG. 8 shows the current-voltage curve and power density curve of membrane-electrode assemblies produced in Comparative Examples 1 and 2 and Example 1.

Figure 9:
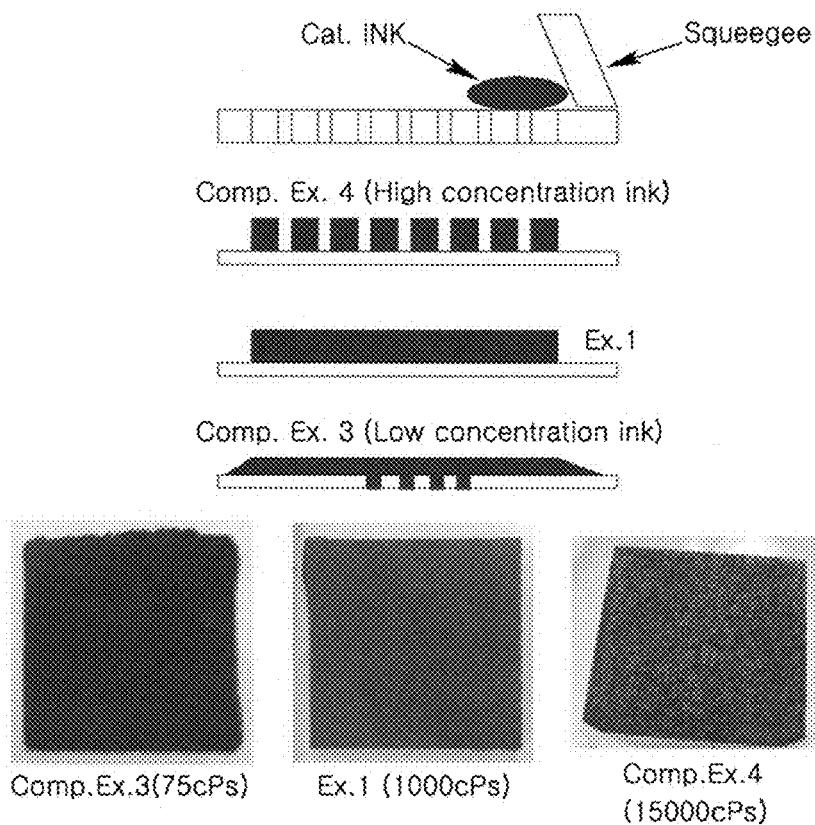

FIG. 9 shows not only schematic diagrams illustrating the coating state of an active layer according to the viscosity of catalyst ink in electrodes which had been produced by coating catalyst inks having viscosities of 75 cPs (Comparative Example 3), 1,000 cPs (Example 1), and 15,000 cPs (Comparative Example 4), respectively, on a diffusion layer by using a screen printing process, but also photographs of the electrodes.

Figure 10:
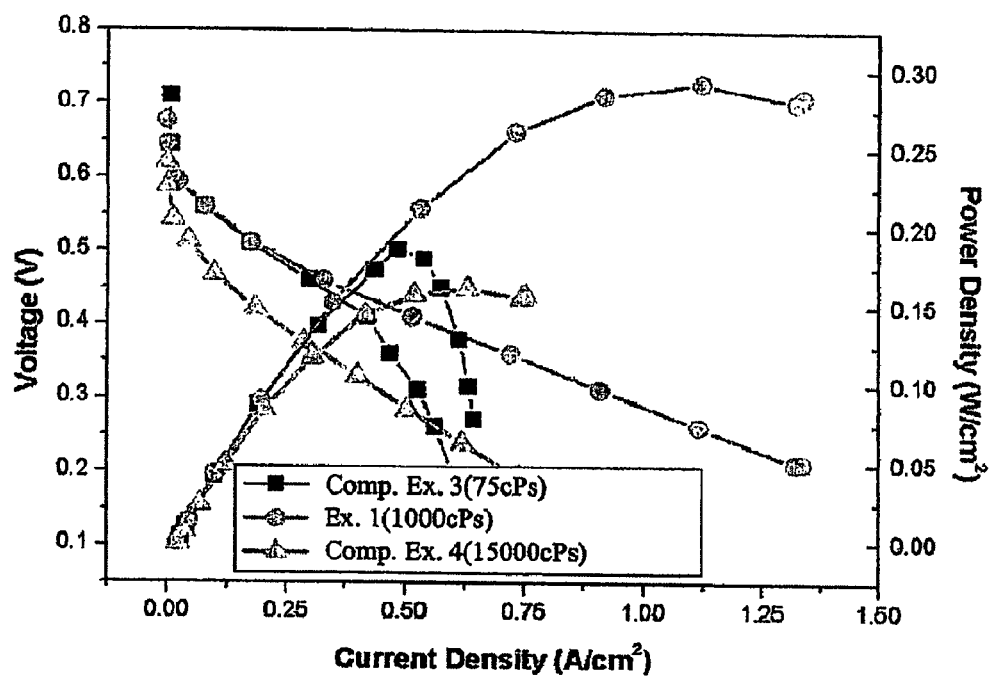

FIG. 10 shows the current-voltage curve and power density curve of membrane-electrode assemblies produced in Example 1 and Comparative Examples 3 and 4.

Figure 11:
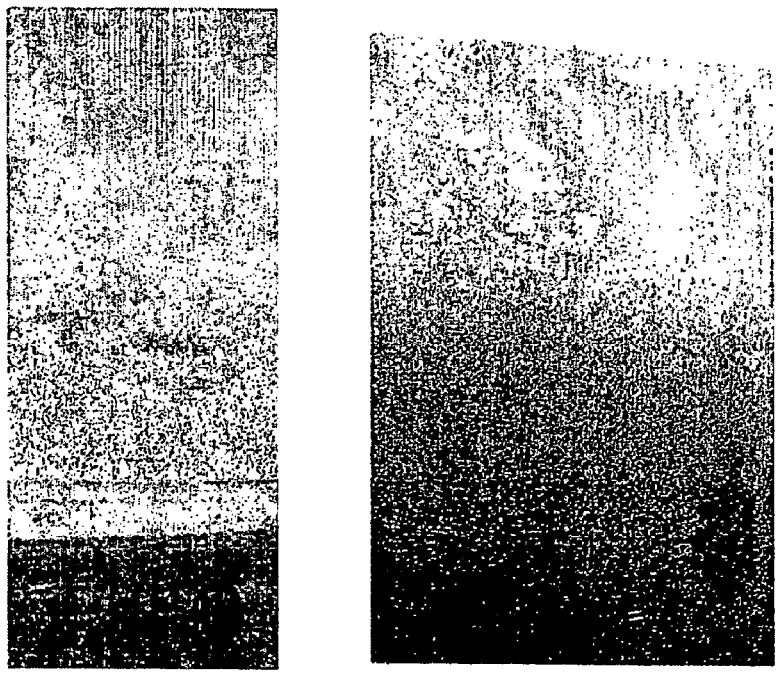

FIG. 11 shows photographs of the front side (left figure) and backside (right figure) of an electrode where an active layer had been coated at a condition of 75 cPs by a die coating process in Comparative Example 5.

Figure 12:
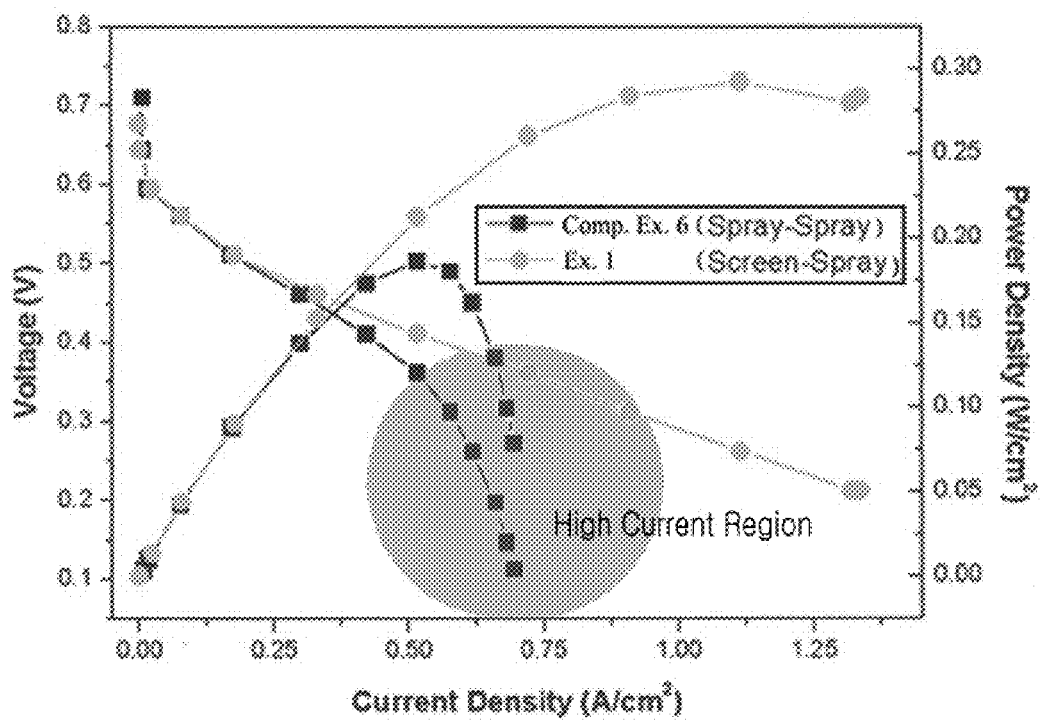

FIG. 12 shows the current-voltage curve and power density curve of membrane-electrode assemblies produced in Example 1 and Comparative Example 6.

Figure 13:
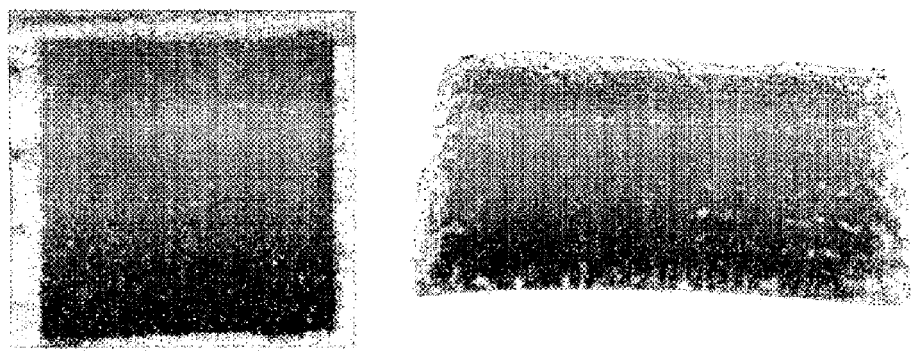

FIG. 13 shows photographs of an electrolyte membrane which had been coated with an active layer by a screen printing technique in Comparative Example 7.

Figure 14:
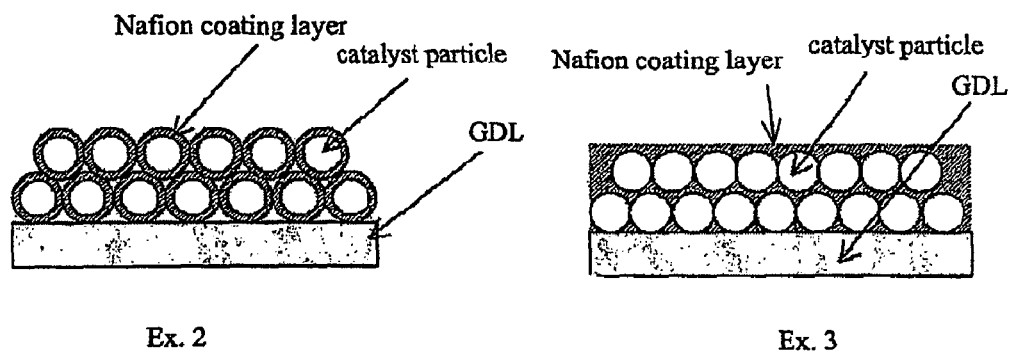

FIG. 14 shows the structure of a catalytic layer coated on a gas diffusion layer in membrane-electrode assemblies produced in Examples 2 and 3.

Figure 15:
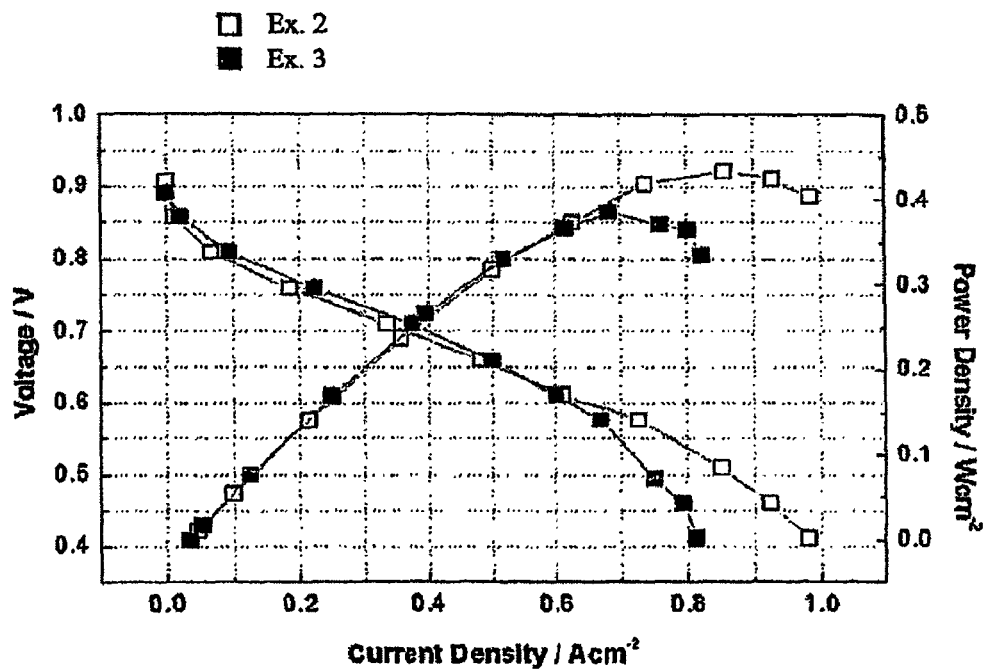

FIG. 15 shows a current-voltage curve and power density curve in hydrogen fuel cells (PEMFC) which include membrane-electrode assemblies produced in Examples 2 and 3, respectively.

DISCLOSURE OF THE INVENTION

Therefore, it is an object of the present invention to provide an epoch-making method which can solve the problem of formation of the unstable interface occurring in the prior art and allows catalyst availability to be increased.

The present inventors have extensive studies to produce a membrane-electrode assembly (MEA) overcoming the above-described disadvantages occurring in the prior art, and consequently found that if a hybrid coating technique in which an active layer containing a catalyst material is coated on each of an electrolyte membrane and a diffusion layer forming interfacial resistance was used, interfacial resistance could be reduced as compared to that in a case of coating the active layer on either of the electrolyte membrane and the diffusion layer, and also the control of viscosity in forming the active layer on the diffusion layer could result in an increase in catalyst availability. On the basis of these findings, the present invention has been perfected.

Furthermore, the coating of the active layer on the gas diffusion layer by the hybrid coating technique was performed by a curtain coating process, such as screen printing, die coating or blade coating, which facilitates mass production.

Figure 1:
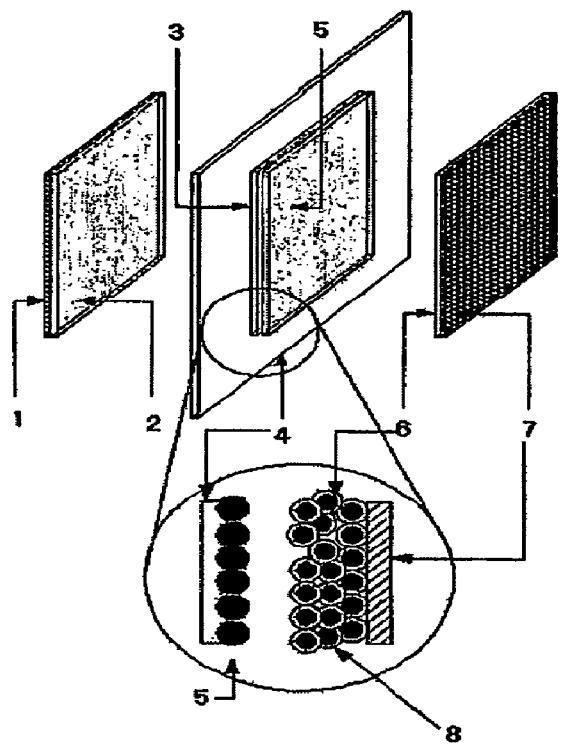
FIG. 1 is a schematic diagram showing a hybrid membrane-electrode assembly according to the present invention.

In one aspect, the present invention provides a membrane-electrode assembly comprising: electrodes consisting of a anode comprising a gas diffusion layer and a catalyst material-containing active layer, and an cathode comprising a diffusion layer and a catalyst material-containing active layer; and an electrolyte membrane interposed between the anode and the cathode and comprising a catalyst material-containing active layer at one or both sides, the electrodes being hot-pressed to the electrolyte membrane, wherein the viscosity of the active layer in coating the active layer on the gas diffusion layer is in a range of 100 to 10,000 cPs (see FIG. 1).

In another aspect, the present invention provides a method for producing a membrane-electrode assembly, comprising the steps of: (a) forming a catalyst material-containing active layer on the surface of an electrolyte membrane; (b) forming a catalyst material-containing active layer on the surface of a gas diffusion layer; and (c) hot-pressing the gas diffusion layer to the electrolyte membrane, wherein the viscosity of the active layer, which is applied on the gas diffusion layer at the step (b), is controlled in a range of 100 to 10,000 cPs. In this method, the steps (a) and (b) may be performed simultaneously, sequentially or in reverse order.

The present invention is characterized in that, in producing the membrane-electrode assembly, the catalytic active layer is coated on each of the electrolyte membrane and the diffusion layer, and in forming the active layer on the diffusion layer, the viscosity of the active layer is controlled, in order to reduce interfacial resistance and to increase catalyst availability and production rate.

(1) Reduction In Interfacial Resistance

The reaction in fuel cells mainly occurs at the interface between the catalytic active layer and the electrolyte membrane. Namely, cations generated from a catalyst are passed through the electrolyte membrane and subjected to electrochemical reaction at an opposite-side catalyst. For this reason, the laminating state between the electrolyte membrane and the catalytic active layer (formation of three-phase reaction zone) is very important.

As can be seen in FIG. 2, if the catalytic active layer is formed directly on the electrolyte membrane, a good laminating state between the electrolyte membrane and the catalytic active layer will be obtained. On the other hand, coating a catalyst on the diffusion layer results in resistance to the transport of cations generated from the catalyst to the electrolyte membrane even if hot pressing is performed, since a depth to which the electrolyte membrane (nafion) penetrates into the catalytic active layer is limited.

Interfacial resistance can be examined by impedance measurement. For example, the measurement of impedance of MEA in a single cell by a two-electrode impedance method using a Zahner IM6 impedance analyzer, i.e., the measurement of impedance in a 1M-1 kHz region at an alternating current amplitude of 5 mV using the flow of 400 sccm hydrogen gas through a reference electrode and the flow of 2000 sccm air through a working electrode, showed an interfacial resistance of 25-30 mΩ*6.25 for the direct coating (the case of forming a catalytic layer on an electrolyte membrane), and an interfacial resistance of 35-40 mΩ*6.25 for the indirect coating (the case of forming a catalytic layer on a diffusion layer).

Thus, the present invention aims to reduce interfacial resistance by coating the catalytic active layer on both the electrolyte membrane and the gas diffusion layer in the membrane-electrode assembly.

(2) Increase In Catalyst Availability

A first approach to increase catalyst availability is to increase the electrochemical utilization efficiency of the catalyst in MEA, and a second approach is to increase the amount of the catalyst coated during the production of MEA.

(a) The electrochemical reaction in a fuel cell occurs in a three-phase reaction zone where a catalyst (e.g., Pt or Pt—Ru), fuel (e.g., methanol solution), and ionomer (e.g., nafion ionomer) are present together. Thus, a catalyst which is not present in the three-phase reaction zone does not participate in the reaction and causes a reduction in catalytic efficiency.

If dilute catalyst ink is used in forming the catalytic layer on the gas diffusion layer (GDL), the catalyst particles with a size of less than about 1 μm will penetrate into the pores of the diffusion layer (see FIGS. 3 and 11), thus reducing the amount of the catalyst used in the reaction. In order to increase the catalytic efficiency (i.e., the efficiency of MEA in the electrochemical reaction), the catalyst particles must not be lost into the diffusion layer (GDL) (see FIG. 4).

For this purpose, the present invention is characterized in that the ionomer membrane (Nafion membrane), an electrolyte membrane where the main reaction occurs, is coated with the catalytic active layer by an air spray process, and catalyst ink with high viscosity is coated on the gas diffusion layer (GDL) by screen coating or die coating. This allows the fabrication of the catalytic active layer without the loss of the catalyst into the diffusion layer.

(b) In the air spray process used in coating the catalytic layer on the electrolyte membrane, the sprayed catalyst particles shows a very low adhesion rate of about 30 wt % and a loss rate of the remaining 70%, resulting in a reduction in catalyst availability. Thus, the present invention is characterized in that a small amount of the catalytic layer is coated on the electrolyte membrane in order to reduce the interfacial resistance of the electrode, and most of the catalytic active layer is coated on the diffusion layer (an adhesion rate of more than 90% for a rotary screen printing process) in order to increase the catalyst availability.

(3) Increase In Production Rate

In coating most of the catalytic active layer on the diffusion layer, the present invention utilizes a curtain coating process, such as screen printing, die coating or blade coating, which makes mass production easy.

Hereinafter, the present invention will be described in detail.

1. Preparation of Catalyst Ink for Active Layer

Both an anode (fuel electrode) and a cathode (air electrode) in a fuel cell contain a catalytic material for electrochemical reaction in an active layer.

Catalyst materials which can be used in the present invention include Pt black, Pt—Ru black, platinum-supported carbon (platinized carbon, Pt/C), platinum-ruthenium-supported carbon (Pt—Ru/C), platinum-molybdenum (Pt—Mo) black, platinum-molybdenum (Pt—Mo)-supported carbon, platinum-rhodium (Pt—Rh) black, platinum-rhodium-supported carbon, and other platinum based alloys.

The catalyst for the anode is preferably Pt—Ru or Pt—Ru/C, and the catalyst for the cathode is preferably Pt or Pt/C. The reaction in the anode generates CO which poisons the catalyst, thus lowering the catalyst activity. In order to prevent this phenomenon, Ru is preferably used as a cocatalyst.

The catalyst particles may be dispersed in carbon particles or made of platinum or alloy blacks.

Examples of catalyst supports which can be used in the present invention include all general carbon black based supports such as Vulcan XC-72R, Vulcan XC-72, acetylene black, Kejon black, and black pearl, as well as conducting complex oxides such as platinum oxide and ruthenium oxide.

The catalyst material of active layer applied on the surface of the electrolyte membrane, which is opposite to the surface of the anode, is preferably the same as the active layer material on the anode, and the catalyst material of active layer applied on the surface of the electrolyte membrane, which is opposite to the surface of the cathode, is preferably the same as the active layer material on the cathode.

However, the composition and coating method of the catalyst ink applied on each of the diffusion layer and the electrolyte membrane are different between the diffusion layer and the electrolyte membrane. In other words, the electrolyte membrane is coated using a catalyst ink having a low viscosity of less than 10 cPs as it is preferably coated by an air spray process. Also, the gas diffusion layer (GDL) is preferably coated using a catalyst ink having a high viscosity of 100-10,000 cPs and more preferably 1,000-10,000 cPs, so that it is preferably coated by a screen printing, blade coating or die coating process.

A solvent/dispersion medium for the active layer of the anode is preferably the same as a solvent/dispersion medium for the active layer of the cathode. Non-limited examples of the solvent/dispersion medium, which can be used in the present invention, include water, butanol, isopropanol (IPA), methanol, ethanol, normal propanol, normal butyl acetate, and ethylene glycol.

The content of the solvent/dispersion medium in the catalyst ink is preferably 1-30% times the weight of the catalyst used. The viscosity of the catalyst ink may vary depending on the amount of the catalyst, and a coating process may be determined depending on the viscosity.

In order to increase the utilization efficiency of the catalyst, it is important to make catalyst ink where the catalyst is well dispersed without aggregation. For this purpose, it is preferable in the present invention that isopropanol (IPA), NAFION solution and water are mixed with each other at suitable amounts to prepare a well-dispersed solvent mixture, which is mixed and stirred with the catalyst so as to disperse the catalyst well and then subjected to a ultrasonic milling process for 5 minutes so as to be uniformly mixed with the catalyst. On a preparation method of the catalyst ink, see FIG. 5.

The composition of the catalyst ink for the active layer of the anode contains, but not limited to, Pt—Ru or Pt—Ru/C, Nafion ionomer (30 wt % based on the weight of the catalyst), and solvent (1-30 times the weight of the catalyst), and the composition of the catalyst ink for the active layer of the cathode contains, but not limited to, Pt or Pt/C, Nafion ionomer (30 wt % based on the weight of the catalyst), and solvent (1-30 times the weight of the catalyst)

2. Coating of Catalyst Ink On Electrolyte Membrane (First Step)

The electrolyte membrane acts as a hydrogen ion ($H^+$) conductor.

Non-limited examples of the electrolyte membrane, which can be used in the present invention, include Nafion™ membrane (manufactured by DuPont Corp, perfluoro sulfonic acid), Flemion (Asahi glass Co.), aciplex (Asahi Chemical Co.), and Gore-select (Gore Co.), as well as all cation electrolyte membranes.

The electrolyte membrane may be either a complex electrolyte membrane or a membrane, the surface of which had been hydrophilically treated.

Coating the electrolyte membrane with catalyst ink will be preferably performed by supplying the catalyst ink by a gas pressure method and coating the catalyst ink on a completely dried electrolyte membrane by a spray process. In this case, the viscosity of the active layer which is coated on the electrolyte membrane is preferably in a range of 1-10 cPs.

In the first step, the coating of the catalyst ink on the surface of the electrolyte membrane is preferably performed by a spray coating process. This is because the spray coating process has an advantage in that it allows a thin catalyst layer to be formed directly on the surface of the polymer electrolyte membrane, thus securing a continuous interface and increasing the availability of the catalyst. Another reason is that coating the catalytic active layer on the electrolyte membrane by a screen method results in the deformation of the electrolyte membrane (see FIG. 13).

At this time, in order to prevent the electrolyte membrane from being swollen by the solvent of the catalyst ink during the production of the membrane-electrode assembly, it is important to maintain the electrolyte membrane in a dried state. It is thus preferable to continuously evaporate the catalyst ink solvent by a thermal dryer during the spray coating, so as to maintain the electrolyte membrane in a dried state. For this purpose, an air spray process is preferably used.

An example of the spray coating process uses a spray gun.

Examples of carrier gas which can be used in the spray coating using the spray gun include inert gases, such as nitrogen and air. The pressure of the carrier gas in the spray coating using the spray gun may be in a range of 0.01 to 2 atm.

An operation temperature at which the active layer is formed on the electrolyte membrane is preferably in a range of 20 to 100° C. An operation temperature of more than 120° C. may cause the problem of Nafion degradation as it approaches 140° C., the glass transition temperature (Tg) of Nafion. Furthermore, the operation temperature may vary depending on the Tg of an electrolyte membrane used.

In addition to the spray process, processes of coating the catalyst ink on the electrolyte membrane include a physical vapor deposition process of coating a very small amount of a catalyst on a membrane using a RF magnetron sputter or a thermal evaporator. Particularly, in order to prevent the crystal growth of the catalyst upon sputtering, co-sputtering with carbon or conductive material may be adopted.

The electrolyte membrane is preferably coated with the active layer using a mask. Namely, it is preferable to form patterns. This is because the electrolyte membrane needs to have a larger area than an area required for reaction since it must not only act as a passage for the transport of an electrolyte but also act to inhibit the flow of reactants (methanol or hydrogen, oxygen) (see FIG. 6).

The amount of the active layer formed on the electrolyte membrane is preferably 1-100% by weight based on the weight of the active layer formed on the diffusion layer. The active layer on the electrolyte membrane is preferably formed to a thickness of less than 1 μm. This is because it is advantageous to coat most of the catalyst on the diffusion layer since a coating process such as screen printing is more advantageous for mass production than that of the spray process.

3. Coating of Catalyst Ink On Diffusion Layer (Second Step)

Although catalyst ink used on the diffusion layer is made of the same material as that of the catalyst ink used on the electrolyte membrane, it preferably contains a solvent at a different ratio from that of the catalyst ink used on the electrolyte membrane. Specifically, it is preferable that the catalyst ink on the diffusion layer has thick viscosity, and the catalyst ink on the electrolyte membrane has dilute viscosity.

The diffusion layer may be formed of carbon paper or carbon cloth (manufactured by SGL, toray, etc.).

If methanol is used as fuel, it will be preferable that the diffusion layer used in the anode is made of a carbon paper or carbon cloth which had not been water-repellent-coated with Teflon in order to effectively supply methanol. In this case, the diffusion layer of the cathode is preferably made of a carbon paper which had been water-repellent-coated with 5-20 wt % of Teflon in order to remove water generated after reaction.

The catalyst ink used in forming the active layer on the gas diffusion layer preferably has a viscosity of 100-10,000 cPs, and more preferably 1,000-10,000 cPs.

In the process of forming the active layer on the diffusion layer, it is most important to control the viscosity of the catalyst ink. This is because the current-voltage curve and power density of the membrane-electrode assembly vary depending on the control of viscosity in forming the active layer on the diffusion layer. Namely, if the catalyst ink has low viscosity, catalyst particles will infiltrate into the porous diffusion layer, so that catalyst particles which do not participate in reaction will significantly increase so as to make catalyst performance insufficient and to require the use of a large amount of catalysts. Particularly, the infiltrated catalyst particles act as serious resistance to the diffusion of the fuel methanol solution at the diffusion layer side of the anode. For this reason, catalyst ink with high viscosity is required.

Processes of coating the catalyst ink for the active layer on the diffusion layer include a curtain coating process (e.g., screen printing, blade coating or die coating) and a spray process.

In order to prevent catalyst particles (less than 1 μm) from infiltrating into the internal pores of the diffusion layer to lower catalyst availability, catalyst ink with the highest possible viscosity needs to be used. Thus, the curtain coating process is more advantageous than a spray process such as air spray. Further, the curtain coating process is advantageous for mass production In forming a catalytic layer on the gas diffusion layer, a catalyst coated with electrolyte powder is preferably used in order to form a three-phase reaction zone while facilitating the control of the catalyst ink viscosity. Then, the electrolyte (Nafion)-coated catalyst powder is preferably mixed with a solvent or dispersion medium. Examples of the solvent or dispersion medium used include water and alcohols, such as butanol, isopropanol (IPA), and normal propanol (NPA). If the Nafion solution is added to the catalyst ink so as to form the three-phase reaction zone, the viscosity of the catalyst ink will be reduced to make the catalyst ink unsuitable for screen printing. Thus, it is preferable to control the catalyst viscosity by performing a pretreatment process where a Pt or Pt—Ru black catalyst is added to Nafion solution, and the solvent of the Nafion solution is dried in a drying oven, thus coating only Nafion electrolyte on the surface of the catalyst particles. By the catalyst pretreatment process as described above, the catalyst viscosity may be easily determined depending on the mixing ratio of the catalyst to the solvent.

A process of coating the catalyst ink prepared as described above on the gas diffusion layer using a screen printer is shown in FIG. 7.

As a coating process such as screen printing is more advantageous for mass production than the spray process, it is advantageous to coat most of the catalyst on the diffusion layer. Thus, it is preferable to form the active layer on the electrolyte membrane to a thickness of less than 1 μm while forming most of the active layer on the diffusion layer.

In the step of forming the active layer on the gas diffusion layer, it is preferable to dry the solvent of the catalyst ink remaining after coating the catalytic layer. The active layer formed on the gas diffusion layer is preferably dried by a hot rolling process, thus making an electrode.

4. Assembly of Electrode And Electrolyte Membrane

The active layer coated on the electrolyte membrane adheres to the active layer (catalytic layer) coated on the gas diffusion layer by hot pressing, thus producing a membrane-electrode membrane (MEA).

The process of hot-pressing the electrode to the electrolyte membrane is preferably performed at a temperature of 50-200° C. under a pressure of 5-100 kg/cm².

THE ADVANTAGEOUS EFFECT

The inventive membrane-electrode assembly has a low interfacial resistance between the membrane and the electrodes, as well as high catalyst availability and excellent power density, and can be mass-produced.

BEST MODE FOR CARRYING OUT THE INVENTION

Hereinafter, the present invention will be described in detail by examples. It is to be understood, however, that these examples are given to illustrate the present invention and not intended to limit the scope of the present invention.

Example 1

Step 1: Coating on Electrolyte Membrane Side

Pt—Ru black was used as a catalyst on a anode side of an electrolyte membrane, and Pt black was used as a catalyst on an cathode side of the electrolyte membrane. Nafion solution, IPA and water were mixed with each other at suitable amounts so as to prepare a well-dispersed solvent mixture. The solvent mixture was mixed with each of the catalysts at a ratio of catalyst:Nafion dry weight:dispersion medium of 1:0.3:50, and stirred to disperse the catalyst well, and uniformly mixed by sonication for 5 minutes, thus preparing catalyst ink. The catalyst ink had a viscosity of 1 cPs.

A Dupont Nafion membrane used as an electrolyte membrane was pretreated with hydrogen peroxide and sulfuric acid and then inserted into a stainless grid used as a mask. The Nafion membrane was heated at the backside of the stainless grid by a thermal dryer for 20 minutes so as to completely remove moisture. The temperature in the thermal dryer was 80° C. Next, each of the catalyst inks (Pt—Ru black for the anode side, and Pt black for the cathode side) prepared as described above was taken and sprayed on the front side of the grid at the amount of 0.1-20 cc/cm² by means of a spray gun, thus forming an active layer with a thickness of less than 1 μm. At this time, the pressure of carrier gas was in a range of 0.01-2 atm, and the solvent of the catalyst ink was continuously evaporated during the spray coating by heating the Nafion membrane at the backside of the grid by a thermal dryer.

Step 2: Coating on Diffusion Layer

As a diffusion layer for use on the anode, carbon paper and carbon cloth which had not been water-repellent-coated with Teflon in order to efficiently supply methanol was used. As a diffusion layer for use in the cathode, carbon paper which had been water-repellent-coated with 5-20 wt % of Teflon in order to remove water generated after reaction was used.

A pretreatment process was performed in which each of Pt black and Pt—Ru black catalysts was added to Nafion solution, and the solvent of the Nafion solution was dried in a drying oven, thus coating only Nafion electrolyte on the surface of the catalyst particles.

As the anode catalyst, the Pt—Ru black pretreated as described above was used, and as the cathode catalyst, the Pt black pretreated as described above was used. IPA and water were mixed with each other at suitable amounts so as to prepare a well-dispersed solvent mixture, and then mixed with each of the catalysts at a ratio of catalyst:nafion dry weight:dispersion medium of 1:0.3:3. The resulting mixture was stirred to disperse the catalyst well, and uniformly mixed by sonication for 5 minutes, thus preparing catalyst inks. The catalyst inks had a viscosity of 1000 cPs.

Each of the catalyst inks prepared as described above was coated on a diffusion layer by means of a screen printer shown in FIG. 7, thus making an electrode with a catalyst content of about 4 mg/cm². The active layer formed on the diffusion layer was dried by a hot rolling process, thus producing a diffusion electrode.

Step 3: Assembling of Electrode and Electrolyte Membrane

A Nafion electrolyte membrane containing an active layer was put between the two electrodes prepared as described above, and hot-pressed at 140° C. under a pressure of 5-100 kg/cm² for 3-10 minutes, thus producing a membrane-electrode assembly (MEA). In this MEA, the Nafion electrolyte membrane was slightly larger than the electrodes, and the sizes of the electrodes and the Nafion electrolyte membrane were 5 cm² and 16 cm², respectively.

Comparative Example 1

Direct Coating

Example 1 was repeated except that, in the preparation of MEA, the catalytic layer (active layer) was formed directly only on the electrolyte membrane using catalyst ink having a viscosity of 1 cPs by an air spray process.

Comparative Example 2

Indirect Coating

Example 1 was repeated except that, in the preparation of MEA, the catalytic layer (active layer) was coated only on the diffusion layer using catalyst ink having a viscosity of 1 cPs by an air spray process and then assembled with the electrolyte membrane by a hot pressing process.

Comparative Example 3

Coating of Diffusion Layer with Catalyst Ink Having Viscosity of Less than 100 cPs Example 1 was repeated except that catalyst ink with a viscosity of 75 cPs was used in coating the catalytic layer (active layer) on the diffusion layer.

Comparative Example 4

Coating of Diffusion Layer with Catalyst Ink Having Viscosity of More than 10,000 cPs Example 1 was repeated except that catalyst ink with a viscosity of 15,000 cPs was used in coating the catalytic layer (active layer) on the diffusion layer.

Comparative Example 5

Die Coating of Diffusion Layer with catalyst ink having viscosity of less than 100 cPs Example 1 was repeated except that the catalytic layer (active layer) was coated on the diffusion layer using catalyst ink having a viscosity of 75 cPs by a die coating process.

FIG. 11 shows photographs of the front side (left figure) and backside (right figure) of the electrode prepared according to Comparative Example 5.

As shown in FIG. 11, it can be found that if catalyst ink with a viscosity of less than 100 cPs is used, catalyst particles will penetrate the electrode support (diffusion layer) so as to impregnate the diffusion layer to the backside of the diffusion layer. The impregnation of the diffusion layer with the catalyst particles causes an increase in the mass transfer resistance of fuel, thus showing a negative effect on performance.

Comparative Example 6

Coating of Catalyst Ink on Diffusion Layer by Spray Coating Process

Example 1 was repeated except that the catalytic layer (active layer) was coated on the diffusion layer using catalyst ink having a viscosity of 1 cPs by a spray coating process. Namely, the active layer was coated on both the diffusion layer and the electrolyte membrane by a spray coating process.

Comparative Example 7

Coating of Catalyst Ink on Electrolyte Membrane by Screen Printing

Example 1 was repeated except that the catalytic layer (active layer) was coated on the electrolyte membrane using catalyst ink having a viscosity of 1000 cPs by a screen printing process.

As shown in FIG. 13, when the active layer was coated on the electrolyte membrane by the screen printing process, one of mass production processes, the Nafion membrane used as the electrolyte membrane would be severely deformed. Due to the severe deformation of the electrolyte membrane, the catalyst particles were not uniformly coated to make the production of MEA impossible.

Example 2

Example 1 was repeated except that a Pt/C (Pt on Carbon) in place of each of Pt—Ru black and Pt black was used as a catalyst (see FIG. 14)

Example 3

Use of Catalyst Particles Uncoated with Nafion

Example 2 was repeated except that, in the preparation of catalyst ink to be coated on the diffusion layer, catalyst particles non-pretreated with the Nafion solution were mixed with a solvent mixture of IPA, Nafion solution and water to prepare the catalyst ink (see FIG. 14).

Experiments

1. Measurement of Interfacial Resistance (Example 1 and Comparative Example 2)

The conductivity of MEA in a single cell was measured with a Zahner IM6 analyzer by a two-electrode impedance method. 400 sccm of hydrogen gas was diffused through a reference electrode, 2000 sccm of air was diffused through a working electrode, and the impedance in a 1M-1 kHz region was measured at an alternating current amplitude of 5 mV.

The membrane-electrode assembly of Comparative Example 2 (indirect coating) had an interfacial resistance of 35-40 mΩ*6.25, whereas the membrane-electrode assembly produced by separately coating the active layer according to Example 1 (direct coating) had a low interfacial resistance of 25-30 mΩ*6.25.

2. Measurement of Power Density (Example 1 and Comparative Examples 1 and 2)

The power densities of the membrane-electrode assemblies produced in Example 1 and Comparative Examples 1 and 2 were measured.

The power density measurement was carried out under the following operation conditions of a single cell: anode catalyst: Pt/Ru black; cathode catalyst: Pt black; operation temperature: 80° C.; amount of use of catalyst: 4 mg/cm$^2$; fuel: 2M CH$_3$OH; 1000 cc/min of oxygen; and ambient pressure.

FIG. 8 shows power density curves according to the production methods of the membrane-electrode assembly. As shown in FIG. 8, it can be found that the use of the hybrid coating method according to Example 1 shows a more than 50% increase in power density.

Namely, it can be found from FIG. 8 that even the use of the catalysts with the same amount shows the deviation in performance, and the indirect-direct hybrid coating method has excellent performance. This suggests that the membrane-electrode assembly produced according to the present invention has high catalyst availability.

3. Measurement of Coating State and Power Density According to Viscosity in Screen Coating on Diffusion Layer (Example 1 and Comparative Examples 3 and 4)

FIG. 9 shows not only schematic diagrams illustrating the coating state of the active layer according to the viscosity of catalyst ink in the electrodes which had been produced by coating catalyst inks having viscosities of 75 cPs (Comparative Example 3), 1,000 cPs (Example 1), and 15,000 cPs (Comparative Example 4), respectively, on a diffusion layer by using a screen printing process, but also photographs of the electrodes.

As is evident from FIG. 9, the electrode of Comparative Example 3 which had been screen-printed with catalyst ink having a viscosity of less than 100 cPs (75 cPs) showed the penetration of catalyst particles into the diffusion layer due to the low viscosity of the catalyst ink. Thus, the electrode of Comparative Example 3 had catalyst loss and will prevent the diffusion of fuel. The electrode of Comparative Example 4 which had been screen-printed with catalyst ink having a viscosity of more than 10,000 cPs (15,000 cPs) showed non-uniform coating due to the poor flowability of the catalyst ink.

Meanwhile, the power densities of the membrane-electrode assemblies produced in Example 1 and Comparative Examples 3 and 4 were measured under the following operation conditions of a single cell:

Anode catalyst: Pt/Ru black; cathode catalyst: Pt black; operation temperature: 80° C.; amount of use of catalyst: 4 mg/cm$^2$; fuel: 2M $CH_3OH$; 1000 cc/min of oxygen; and ambient pressure.

As shown in FIG. 10, the case of Comparative Example 3 (75 cPs) showed a sharp reduction in performance, since catalyst particles plugged the pores of the diffusion layer upon screen printing so as to cause the mass transfer resistance of fuel in a high-current region. Meanwhile, the case of Comparative Example 4 (15,000 cPs) showed low performance in a low-current region, since catalyst particles were coated at a lower amount than the desired loading amount due to the poor coating of the catalyst ink.

4. Power Densities According to Coating Methods (Example 1 and Comparative Example 6)

The power densities of the membrane-electrode assemblies produced in Example 1 and Comparative Example 6 were measured.

The power density measurements were carried out under the following operation conditions of a single cell:

Anode catalyst: Pt/Ru black; cathode catalyst: Pt black; operation temperature: 80° C.; amount of use of catalyst: 4 mg/cm$^2$; fuel: 2M $CH_3OH$; 1000 cc/min of oxygen; and ambient pressure.

In the case of Comparative Example 6 where the active layer was formed on carbon paper or carbon cloth used as the diffusion layer by spray coating process and assembled with the electrolyte membrane by a hot pressing process, a significantly large amount of catalyst particles penetrated into the diffusion layer by the spray coating process so as to make it impossible to participate in reaction, and acted as resistance to the diffusion of the fuel methanol solution. Accordingly, as shown in FIG. 12, it can be found that, in the case of Comparative Example 6, the mass transport in a high-current region where reaction actively occurs to require the active supply of fuel reactants (methanol or hydrogen), is not smooth, resulting in a severe deterioration in performance.

5. Power Densities According to Whether Catalyst Particles are Coated with Nafion or not (Examples 2 and 3)

The power densities of the membrane-electrode assemblies produced in Examples 2 and 3 were measured in a hydrogen fuel cell (PEMFC).

The power density measurements were carried out under the following operation conditions of a single cell:

Anode catalyst: Pt/C; cathode catalyst: Pt/C; operation temperature: 70° C.; amount of use of catalyst: 0.4 mg/cm$^2$; fuel: $H_2$; and ambient pressure of air.

FIG. 15 shows the comparison between Example 2 where the catalyst particles were coated with electrolyte (Nafion) and Example 3 where the catalyst particles were not coated with the electrolyte (Nafion). As shown in FIG. 15, the electrode fabricated using the electrolyte (Nafion)-coated catalyst particles had a relatively low mass transport resistance, indicating superiority in performance.

In the case of Example 2, an electrode structure was formed in which the electrolyte (Nafion)-coated catalyst particles were coated on the diffusion layer so as to maintain the pores among catalyst particles at the maximum as shown in the left figure of FIG. 14. The maintained pores provide an improvement in the electrode performance by forming a passage through which fuel can be smoothly supplied to the active section of the catalysts.

The invention claimed is:

1. A method for producing a membrane-electrode assembly comprising electrodes consisting of an anode comprising a gas diffusion layer and a catalyst material-containing active layer, a cathode comprising a diffusion layer and a catalyst material-containing active layer, and an electrolyte membrane interposed between the anode and the cathode and comprising a catalyst material-containing active layer at one or both sides, the method comprising the steps of:
   (a) forming a catalyst material-containing active layer on the surface of a electrolyte membrane;
   (b) forming a catalyst material-containing active layer on the surface of a gas diffusion layer; and
   (c) hot-pressing the gas diffusion layer to the electrolyte membrane,
   wherein the viscosity of the active layer, which is applied on the gas diffusion layer at the step (b), is controlled in a range of 100 to 10,000 cPs, and the viscosity of the active layer, which is applied on the electrolyte membrane at the step (a), is less than 10 cPs.

2. The method of claim 1, wherein, at the step (a), catalyst ink fed by a gas pressure method is coated on the dried electrolyte membrane by a spray process.

3. The method of claim 2, wherein, at the step (a), the electrolyte membrane is maintained in a dried state by a thermal dryer.

4. The method of claim 1, wherein, at the step (b) is performed by coating the catalyst with electrolyte powder, mixing the coated catalyst powder with a solvent so as to prepare catalyst ink, and coating the catalyst ink on the gas diffusion layer so as to form the active layer.

5. The method of claim 1, wherein the step (a) is carried out at an operation temperature of 20-100° C.

6. The method of claim 1, wherein the step (c) is carried out at an operation temperature of 50-200° C. under a pressure of 50-100 kg/cm$^2$.

7. The method of claim 1, wherein the step (b) further comprises performing a dry coating process to the gas diffusion.

* * * * *